Feb. 20, 1951 P. V. WELCH 2,542,742

PILOT LAMP STATION LINE CIRCUITS

Filed June 9, 1949

INVENTOR
P. V. WELCH

BY A. F. Kane

ATTORNEY

Patented Feb. 20, 1951

2,542,742

UNITED STATES PATENT OFFICE 2,542,742

PILOT LAMP STATION LINE CIRCUITS

Paul V. Welch, Brooklyn, N. Y., assignor to Bell Telephone Laboratories, Incorporated, New York, N. Y., a corporation of New York Application June 9, 1949, Serial No. 97,942

7 Claims. (Cl. 179—51)

This invention relates to switchboard call signal apparatus and circuits and particularly to such apparatus and circuits as employed in multiple type switchboards.

Telephone subscribers' lines and other types of line circuits are commonly provided with multiple appearances at a central office switchboard, each appearance comprising a line jack and a corresponding line lamp mounted at each of several sections of the switchboard called multiples. All the lamps for any line are connected in multiple and consequently they respond simultaneously to the origination of a call on the line to which they correspond. Thus an incoming call is manifested at a number of locations on the switchboard and may be answered by any of a number of operators attending the switchboard.

In large switchboards particularly, where the line lamps corresponding to a great number of line circuits are mounted in a vertically disposed panel it is customary to locate a pilot lamp at the bottom of the panel and to control it by means of a pilot control relay in such a manner that whenever a line lamp is lighted in the panel the pilot lamp is also lighted to advise the attending operator that there is one or more lighted lamps in the panel and corresponding calls awaiting attention.

In general, the use of panel pilot lamps on multiple type switchboards has been confined to switchboards where the lines are equipped with but a single lamp each, it having been experienced heretofore, that the use of the pilot lamp in boards with multiple line lamps resulted in wiring complexities which precluded the possibility of changing the load distribution at the switchboard without resorting to the services of a maintenance man, or otherwise introduced conditions which resulted in false operation of the pilot lamps.

The most desirable method of varying the load distribution at a switchboard is one which attains the objective by the simple expedient of removing line lamps from their sockets in one or more panels and, if desirable, inserting them in sockets in other panels. Thus, calls on any particular line circuit may, at the will of the chief operator, be caused to appear at certain switchboard appearances and not at others. Heretofore, it was impossible to distribute the load in this simple manner on multiple swtichboards because of the attendant introduction of spurious current paths involving the winding of the pilot control relay of a panel having unoccupied lamp sockets. It was discovered that the pilot control relay of a panel from which a line lamp was removed frequently remained operated over spurious current paths which come into being incident to the origination of a call on the line corresponding to the lamp socket from which the lamp was removed. Obviously, such pilot control relay should not be operated under this condition unless calls on other lines whose line lamps are located in the corresponding panel are awaiting attention. This untimely operation of the pilot control relay results in the false operation of the corresponding panel pilot lamp.

It is the object of this invention to adapt telephone switchboards of the multiple type for use with panel pilot lamps and, at the same time, to permit changes in the load distribution at the switchboard to be made at will and wtihout affecting the normal operation of the pilot lamps.

This object is attained in accordance with a feature of the invention by the provision of means for diverting spurious currents from the pilot control relays and thus precluding false operation of the panel pilot lamps. More particularly, each of the line lamp leads which, incident to the operation of the corresponding line relay, has battery connected thereto to effect the operation of the corresponding multiple line lamps and pilot control relays are normally maintained at ground potential under control of the line relay so as to effectively shunt the pilot control relay of a panel having an unoccupied lamp socket when the line relay corresponding to such socket is operated.

Another feature of the invention contemplates means for precluding the possibility of service failure in the event of overheating of the panel pilot relays incident to a traffic overload which might occur under abnormal conditions.

These and other features of the invention will be better understood from the following detailed description when read with reference to the accompanying drawing, in which:

Fig. 1 is a wiring diagram illustrating four subscribers' lines terminating in multiple jacks at a switchboard. In this figure the switchboard is indicated as comprising four seven-panel multiples, the first panel in each multiple showing multiple jack terminations for subscribers' lines Nos. 1, 2, 99 and 100. It will be observed that each line jack is associated with a lamp jack and that in each of panels Nos. 8, 15, and 22 one lamp jack is shown unoccupied. The showing in Fig. 1 is by way of illustration and details not essential to an understanding of the invention have been omitted for purposes of simplicity.

Figures 1, 2, 3:
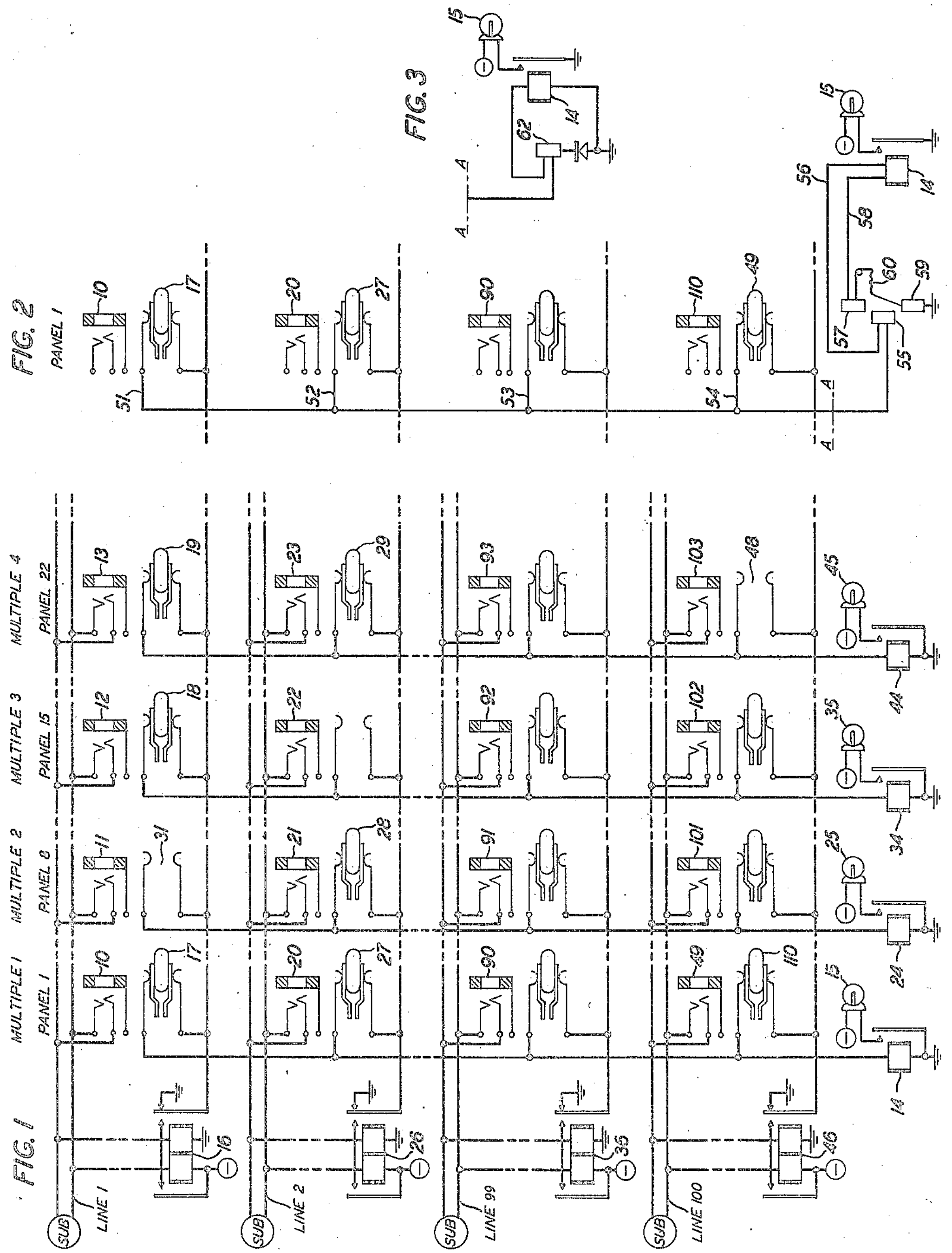
Fig. 2 is a circuit diagram illustrating the wiring of one switchboard panel in accordance with a modification of the invention.
Fig. 3 illustrates a further modification of the wiring of the pilot control relay.

Referring to Fig. 1, the four subscribers' lines illustrated are designated lines 1, 2, 99 and 100. Line 1 is shown terminating in multiple jacks 10, 11, 12 and 13 which occupy positions in panels Nos. 1, 8, 15 and 22, respectively, of the four switchboard multiples indicated. Line 2 is shown terminating in multiple jacks 20, 21, 22 and 23 which also occupy positions in panels Nos. 1, 8, 15 and 22, respectively, of the four switchboard multiples. Similarly, lines 99 and 100 are terminated in jacks 90, 91, 92 and 93 and in jacks 110, 101, 102 and 103, respectively, of the switchboard. Associated with each line jack is a lamp jack all of which but those associated with jacks 11, 22 and 103 are shown housing a line lamp. All the lamp jacks located in panel No. 1 are individually serially associated with the winding of pilot control relay 14; all those located in panel No. 8 are similarly associated with the winding of pilot control relay 24; all those in panel No. 15 are similarly connected in series with the winding of pilot control relay 34, and those in panel No. 22 with the winding of pilot control relay 44.

Pilot control relays 14, 24, 34 and 44 control operating circuits for panel pilot lamps 15, 25, 35 and 45 respectively.

Each of the lines 1, 2, 99 and 100 is shown terminating in the windings of a line relay 16, 26, 36 or 46, it being understood that actually the line conductors are connected to the line relay windings by way of armature contacts controlled by a cut-off relay not shown, but well known in the art.

When a call is originated on any line, line 1 for example, the corresponding line relay 16 operates in well-known manner over the closed station loop. At its armatures and front contacts line relay 16 completes obvious operating circuits for the multiple line lamps 17, 18 and 19 which include the windings of pilot control relays 14, 34 and 44, respectively. The lamps 17, 18 and 19 are lighted in these circuits and the relays 14, 34 and 44 operate to complete obvious energizing circuits for panel pilot lamps 15, 35 and 45, respectively. The lighting of lamps 17, 18 and 19 identify, at their respective switchboard multiples, the calling line and the lighting of lamps 15, 35 and 45 serves to advise the attending operators that in each of panels Nos. 1, 15 and 22 there is a line lamp lighted and a call on the corresponding line awaiting attention. Any operator having access to line jacks 10, 12 or 13 may answer the call in well-known manner. Answering the call at the switchboard results in the operation of the corresponding cut-off relay (not shown) which, in turn and in well-known manner causes the deenergization of line relay 16. The line lamps 17, 18 and 19 are thus extinguished and, unless another call on any of the other lines is awaiting attention, relays 14, 34 and 44 release and extinguish their associated panel pilot lamps.

For explanatory purposes let it be assumed that the grounded back contact of each of the line relays 16, 26, 36 and 46 has been omitted and that prior to the origination of the call on line 1, as described, a call on line 2 had been originated. This second call would have resulted in the lighting of line lamps 27, 28 and 29 and also in the energization and operation of pilot control relays 14, 24 and 44 in a manner now apparent. If this second call is answered before the call on line 1 is answered it is obvious that line lamps 27, 28 and 29 would be extinguished and that pilot control relay 24 should be deenergized, since this relay does not operate on a call from line 1 because of the vacant lamp jack 31 in panel No. 8 to which the pilot control relay 24 is individual.

However, spurious current paths which include the winding of pilot control relay 24 may be traced back to battery at the armature contacts of the now operated line relay 16. One such path extends from grounded battery, over the armatures and front contacts of relay 16, filament of line lamp 17, filaments of line lamps 27 and 28 to ground by way of the winding of relay 24. Numerous other similar paths may be traced by way of the filaments of other line lamps. The current which traverses these paths is not great enough to light the lamps included therein but is of sufficient magnitude to maintain relay 24 operated, it being understood that the resistance of the line lamps is high in comparison to that of the windings of the pilot control relays.

Relay 24 therefore would remain operated under the assumed conditions when it should be released. Panel pilot lamp 25 therefore would be lighted falsely. To preclude such false operation of the pilot control relays each lamp lead controlled by a line relay is normally grounded by way of a back contact of the line relay. Hence the spurious current paths instead of finding ground potential by way of the winding of a pilot control relay, such as relay 24, find direct ground at the right armature and back contact of the unoperated line relays. In this manner the spurious currents are diverted from the pilot control relays and their false operation precluded.

The wiring arrangement just described permits traffic loads at the switchboard to be varied at will by the chief operator. For example, should it be found desirable to relieve the operator having access only to multiple No. 1 by decreasing the number of lines to be attended to by that operator, it is only necessary that one or more line lamps such as line lamp 49 be removed from its socket or jack and inserted elsewhere, if necessary, in the lamp jack 48, for example, located in multiple No. 4. Under this condition calls originated on line 100 would no longer appear at the switchboard section designated multiple No. 1. This simple method of shifting of the load at the switchboard from multiple to multiple is made possible by the invention herein described. Heretofore any attempts to employ panel pilot lamps in a multiple switchboard resulted in false operation of the pilot control relays or involved wiring complexities which precluded the possibility of load shifts being made by the simple expedient of shifting line lamps on the board and necessitated the services of a maintenance man.

The line relays are illustrated with two armatures while it might appear that but one would suffice. However, it is apparent that should battery be connected to the front contact controlled by the right armature of the relay, fuse blowing would result should a maintenance man apply an adjusting tool to the relay spring, the associated back contact of which is grounded and the corresponding front contact of which is connected to battery.

The switchboard panel disclosed in Fig. 2 corresponds to panel No. 1 of Fig. 1 and, where possible, the same designations are used in the two figures to identify similar elements. The wiring of Fig. 2 distinguishes from that of Fig. 1 principally in the use of individual leads from the line lamps and of a well-known type of fuse structure having its fusible element included in series with the winding of the pilot control relay.

The several individual lamp leads are designated by the numerals 51, 52, 53 and 54 respectively. All of these leads are conductively connected to a common connector comprising the alarm stud 55 of the fuse A. A separate lead 56 also conductively associated with the alarm stud 55 extends therefrom to one terminal of the windings of relay 14, the other terminal of which is connected to the fuse mounting stud 57 by the conductor 58. The stud 57 is connected to a third grounded fuse terminal 59 by way of a fusible element 60 and a spring 61. The fuse A may be of the type disclosed in Patent No. 817,959 to E. B. Craft, issued April 17, 1906.

When any of the line relays corresponding to the line lamps illustrated operate, the line lamps are lighted in circuits which include the winding of relay 14, fusible element 60, spring 61 and the grounded fuse mounting stud 59. Relay 14 operates and causes its associated panel pilot lamp 15 to be lighted.

In the event of an overload which may occur in times of panic caused by fire or other abnormal occurrence it is possible that the current traversing the windings of relay 14 might exceed tolerable limits and cause an interruption of telephone service if ordinary fusing was depended upon. In the illustrated arrangement the excessive current causes the rupture of the fusible element 60 whereupon the spring element 61 moves into engagement with the fuse mounting stud 55 to extend the lamp leads 51, 52, 53 and 54 to the grounded stud 59. Thus the line lamp circuits are maintained operative though the panel pilot lamp and its control relay are disabled. Telephone service therefore, is maintained uninterrupted under conditions when service continuity is most essential.

In Fig. 3 the lamp leads are connected to a common terminal 62 and a variable resistance, in the nature of a copper oxide varistor is connected in shunt with the winding of the pilot control relay 14. This arrangement serves also to prevent overheating.

What is claimed is:

1. In combination, telephone subscribers' lines, a telephone switchboard comprising a line lamp for each of said lines, a pilot lamp, a relay for controlling the operation of said pilot lamp having one winding terminal connected to ground potential, means connecting one terminal of each of said line lamps to the ungrounded winding terminal of said relay, a line relay for each of said subscribers' lines, operable means for normally maintaining the other terminal of the corresponding line lamp at ground potential and, when operated, for completing an operating circuit for its corresponding line lamp and said pilot control relay and means whereby said operable means are controlled by each of said line relays.

2. In combination, telephone subscribers' lines, a telephone switchboard comprising a plurality of multiple sections, a line lamp for each of said lines in each of said sections, a pilot lamp individual to each section, a control relay for each pilot lamp having one winding terminal connected to ground potential, means connecting one terminal of each of the line lamps in any one section to the ungrounded winding terminal of the corresponding pilot control relay, a line relay for each of said subscribers' lines, operable means for normally maintaining the other terminal of each of the corresponding line lamps at ground potential and, when operated, for completing operating circuits for the corresponding line lamps and their corresponding pilot control relays and means whereby said operable means are controlled by each of said line relays.

3. In combination, a telephone subscriber's line, a line lamp for said line, a pilot lamp, a control relay for said pilot lamp having one winding terminal connected to ground potential, means connecting the other winding terminal of said control relay to one terminal of said line lamp, a battery, a line relay for said line, means for normally connecting ground potential to the other terminal of said line lamp and, at other times, for connecting said battery thereto and means whereby said last means is controlled by said line relay.

4. In combination, a telephone subscriber's line, a switchboard comprising a plurality of multiples, a line lamp for said subscriber's line in each switchboard multiple, a pilot lamp for each multiple, a control relay for each pilot lamp having one of its winding terminals connected to ground potential, means connecting one terminal of each of said line lamps to the ungrounded winding terminal of the corresponding pilot control relay, a lamp lead common to the other terminal of each of said line lamps, and a line relay for said subscriber's line normally connecting said common lamp lead to ground potential.

5. In combination, telephone subscribers' lines, a switchboard, a line lamp for each of said lines at said switchboard, a pilot lamp common to said line lamps, a control relay for said pilot lamp, means including a fusible element connecting one of the winding terminals of said control relay to ground potential, a common connector, circuit means connecting the other winding terminal of said control relay to said common connector, individual circuit means connecting one terminal of each of said line lamps to said common connector, means for completing operating circuits for said line lamps and for the winding of said control relay, means whereby said last means is controlled over said subscribers' lines, and means responsive to a rupture of said fusible element for connecting said common connector to ground potential.

6. In combination, telephone subscribers' lines, a telephone switchboard of the multiple type, each multiple thereof including a plurality of vertical panels and each panel having a jack termination for each of said subscribers' lines, a lamp jack for each of said jack terminations, said lamp jacks having means adapted to accommodate line lamps corresponding to said subscribers' lines, at least one of said lamp jacks being vacant in certain of said vertical panels, a pilot lamp for each of said vertical panels, a relay for controlling the operation of each of said pilot lamps having one winding terminal connected to ground potential, means connecting one terminal of each of the line lamps in a vertical panel to the ungrounded winding terminal of the corresponding pilot relay, a line relay for each of said subscribers' lines, operable means which, when in normal condition, maintains the other terminal of each of the corresponding line lamps at ground potential and, when operated, completes operating circuits for the corresponding line lamps and their corresponding pilot control and means whereby said operable means is controlled by each of said line relays.

7. In combination with a telephone switchboard in which each of a plurality of subscribers' lines is provided with a plurality of multiple jack terminations each located in a different one of a plurality of vertical panels and in which each jack termination is provided with a lamp-accommodating jack and each vertical panel is provided with a pilot lamp and a corresponding pilot relay having a permanently grounded winding terminal and in which at least one of the lamp-accommodating jacks in at least one of the vertical panels is vacant, a line relay for each of said subscribers' lines having a normal position and an operated position, means connecting the ungrounded terminal of each of said pilot relays to one terminal of each of the lamp-accommodating jacks in the corresponding panel, means for connecting the other terminals of all its corresponding lamp-accommodating jacks to ground potential, means whereby said last means is controlled by each of said line relays when in normal position and means controlled by each of said line relays, when operated, for disconnecting ground potential from the said other terminals of its corresponding lamp-accommodating jacks and substituting battery therefor.

PAUL V. WELCH.

REFERENCES CITED

The following references are of record in the file of this patent:

UNITED STATES PATENTS

| Number | Name | Date |
|---|---|---|
| 810,367 | Beyland | Jan. 16, 1906 |
| 1,353,065 | Paca | Sept. 14, 1920 |
| 2,329,004 | Shope | Sept. 7, 1943 |